July 21, 1931.  T. MARTIN  1,815,321
MACHINE FOR MEASURING AND FEEDING GRANULAR MATERIAL
Filed March 9, 1925   5 Sheets-Sheet 1
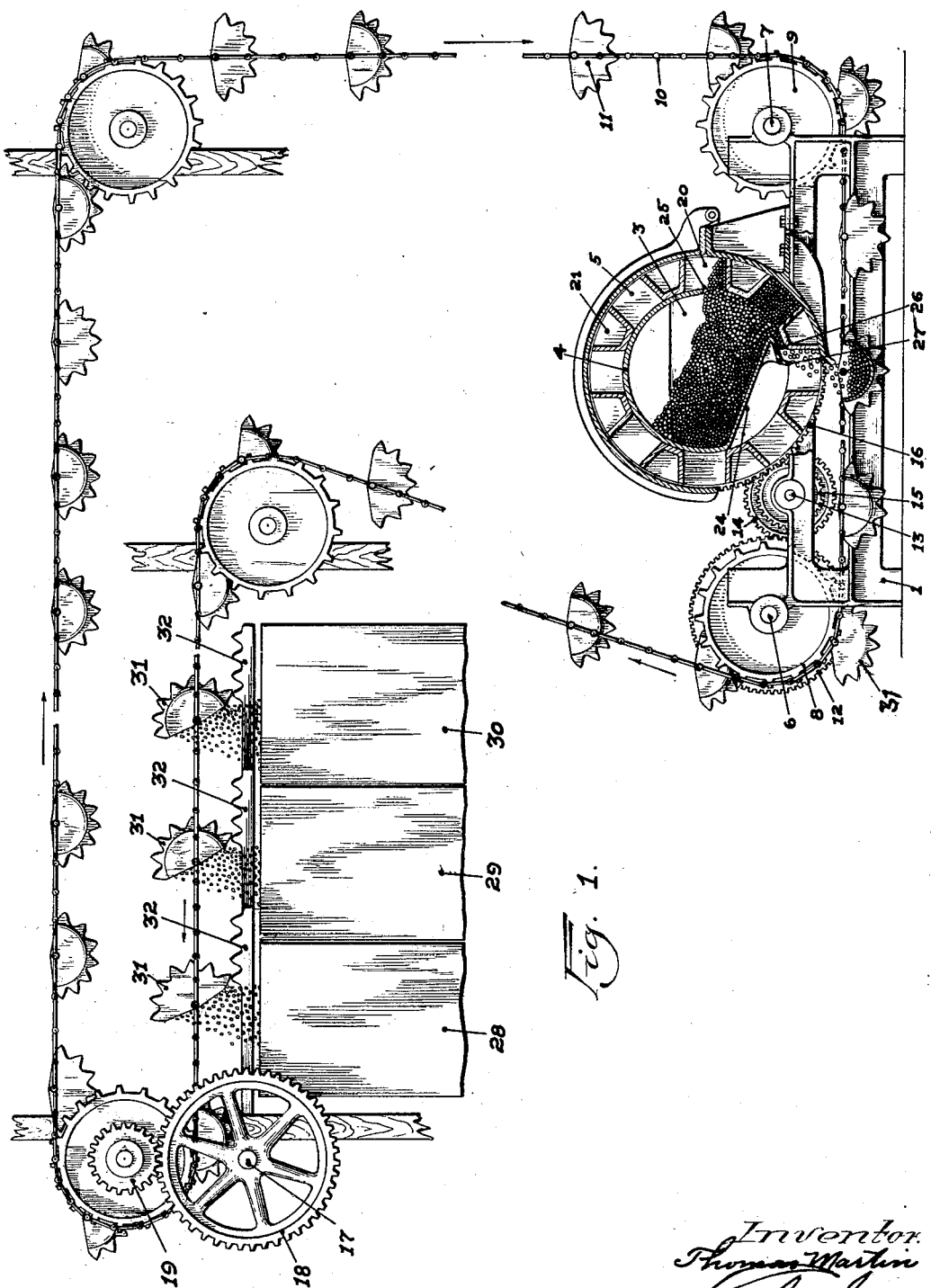

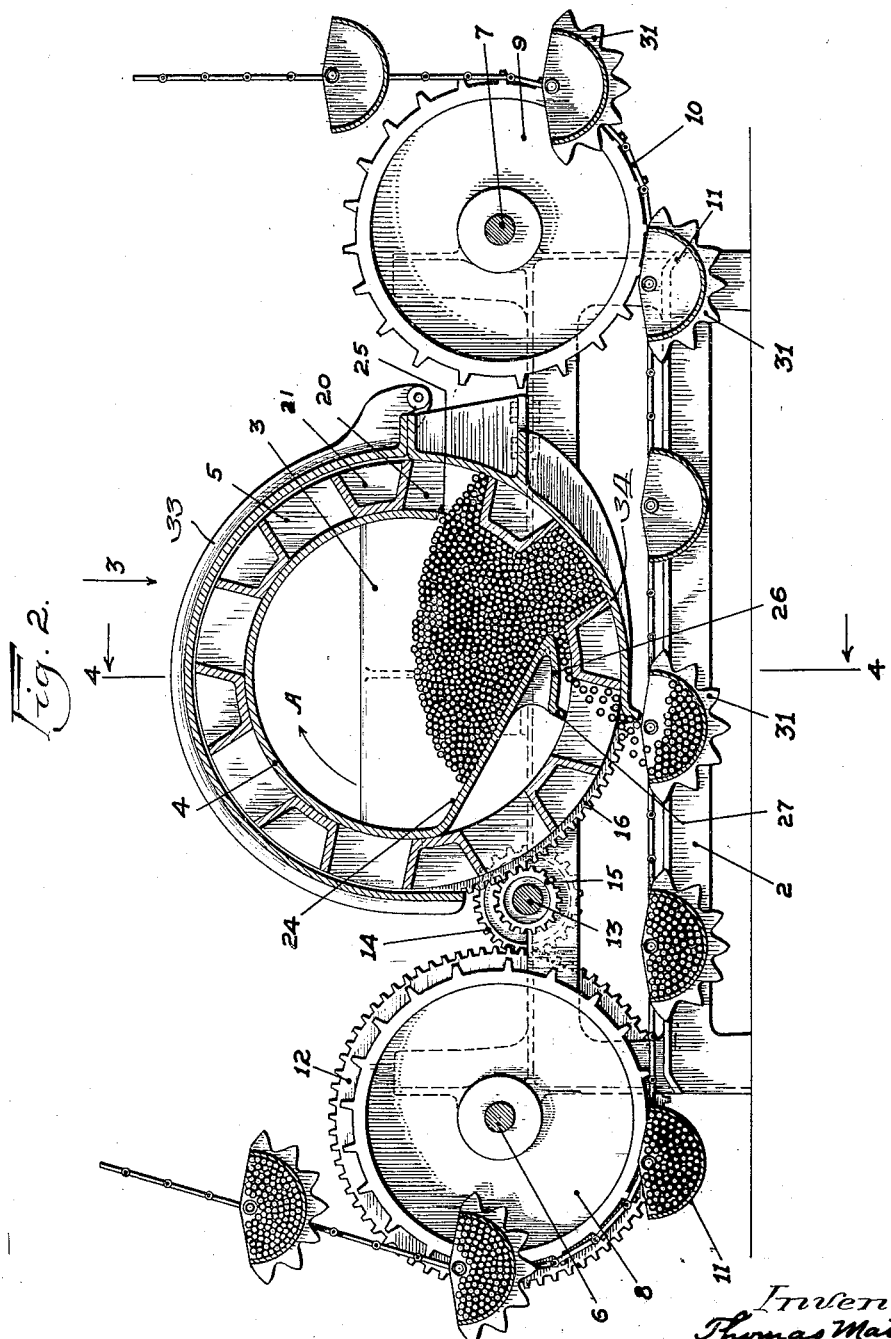

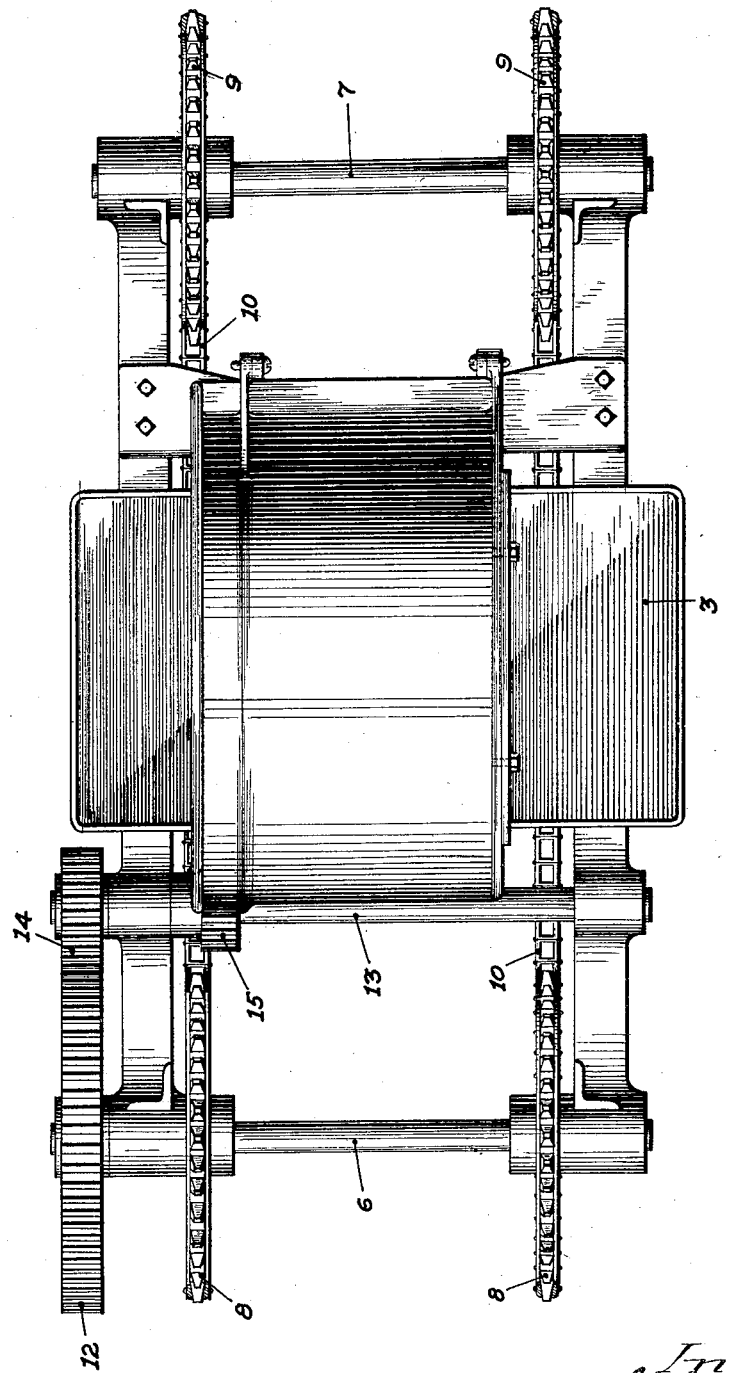

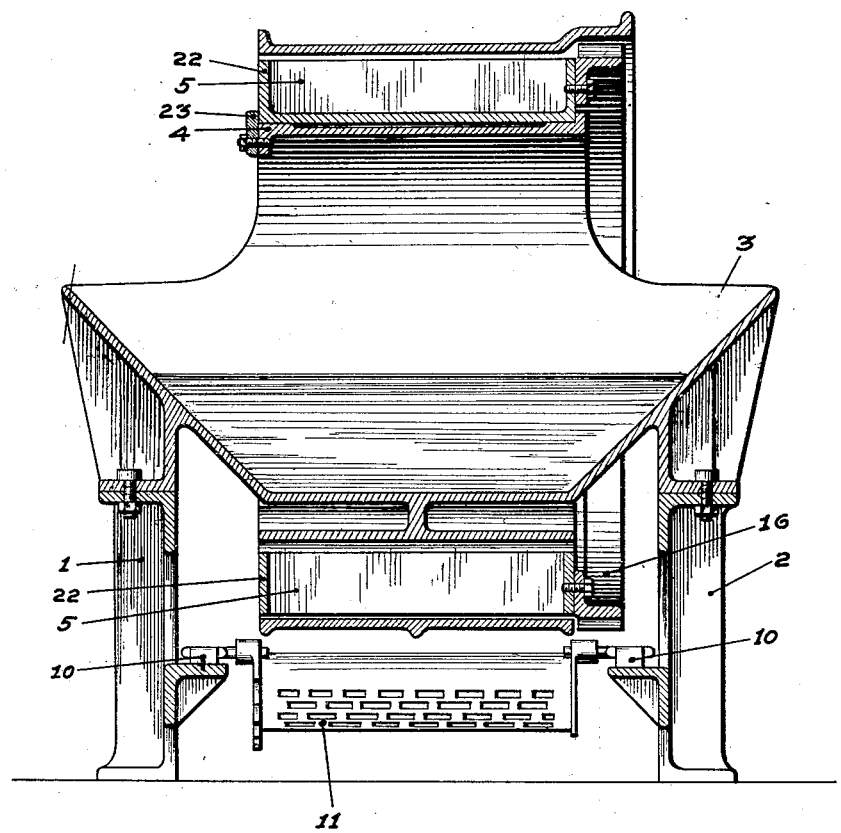

July 21, 1931.  T. MARTIN  1,815,321
MACHINE FOR MEASURING AND FEEDING GRANULAR MATERIAL
Filed March 9, 1925   5 Sheets-Sheet 5

Inventor:
Thomas Martin
By Graham

Patented July 21, 1931

1,815,321

UNITED STATES PATENT OFFICE

THOMAS MARTIN, OF HOOPESTON, ILLINOIS, ASSIGNOR TO SPRAGUE-SELLS CORPORATION, OF HOOPESTON, ILLINOIS

MACHINE FOR MEASURING AND FEEDING GRANULAR MATERIAL

Application filed March 9, 1925. Serial No. 14,192.

This invention relates to an apparatus for measuring and feeding granular materials and is particularly adapted to measuring and feeding green tender peas for canning purposes.

In the general run of machines of this class it has been practically impossible to measure and feed young and tender peas by automatic means without mashing and damaging them to a certain extent, due principally to the shearing action of the measuring devices, wherein edges of moving parts come together and crush some of the peas in cutting off the measured charge.

This crushing of some of the peas tends to make a mussy looking product when in the cans and is detrimental to the otherwise high grading of the peas by the distributors when the cans are opened for inspection. The peas may be of the proper size and quality to grade as "fancies", but if some in the can are crushed and mutilated the product may have to be given a lower grade with a consequent loss to the canner.

It is a principal object of the invention to produce a separating measuring and feeding device for granular materials that will have a graduated, or spaced cut off means for the measuring compartment that will not crush or damage any of the peas.

It is also an object of the invention to provide a measuring and feeding device for granular materials that is continuous in operation, in the same direction and intermittently discharges a measured quantity of granular material.

It is also an object of the invention to provide a measuring and feeding device having a supply of granular material arranged approximately centrally of the rotating feeding and measuring element with a somewhat lateral opening whereby the material passes into the measuring pockets with the least friction and crushing effect.

It is also an object of the invention to provide a measuring and feeding device having only one moving element which conduces to simplicity of construction and operation.

With such objects in view as well as other advantages inherent in the invention, consisting of the parts and combinations which will be made the subject matter of claims hereto appended, I wish it understood that the several necessary elements and combinations constituting the same may be varied in their proportions, placements and general arrangements without departure from the scope and nature of the invention.

In carrying out the objects of the invention in a concrete form or machine, further objects, advantages and improvements have been evolved than have been enumerated and in order to make the invention more clearly understood, there are shown in the accompanying drawings, means and mechanism embodying the preferred structural arrangement of the different parts and combinations, without limiting the claims to the exact details of construction shown, in which I have simply illustrated one way of embodying the creative part or conception of the invention in a concrete form of machine.

The described devices are simply embodiments of the invention which other structures might also employ and some of the parts and combination of parts may be used without the others in different types of such machines without departure from the purview of my invention and I regard myself as entitled to such variation from the shown and described devices as fall within the scope and meaning of the claims.

Reference now being had to the accompanying drawings a better understanding of the invention will be had with the understanding that the said drawings are more or less diagrammatic in character; are not necessarily drawn to scale, neither do they necessarily represent the best or the preferred engineering practice in connection with the construction of machines of this character, also the proportions and relation of some parts may be more or less exaggerated in size or shape to better illustrate the application of the invention to an operative machine.

Fig. 1 of the drawings is a combined side and sectional elevation of my improved measuring and feeding apparatus in operative location and connection with an elevating and distributing conveyor system such as is used in a canning factory. This view very clearly shows the general arrangement of the power and driving means and the manner of conveying and distributing the material handled by the device.

Fig. 2 is an enlarged detail of that part of the apparatus constituting my improved measuring and feeding device and the conveyor element in their proper operative relation.

Fig. 3 is a plan of my improved measuring and feeding device looking in the direction of the arrow 3 on Fig. 2.

Fig. 4 is a vertical sectional elevation of the measuring and feeding device taken on approximately the line 4—4 of Fig. 2.

The reference numerals indicate like parts in the several views.

Figure 6:
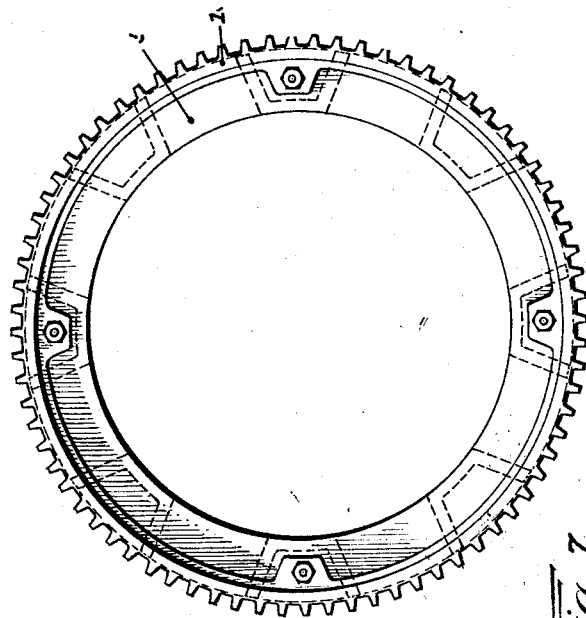
Figs. 5, 6 and 7 are details of the rotor feeding element that constitutes the movable feeding and measuring means.

The general construction and arrangement of the parts of the apparatus comprise side frame members 1 and 2, held in spaced arrangement and operative relation by means of the hopper 3, bolted thereto as best shown in Fig. 4.

The hopper 3 carries a central supporting and bearing portion 4, on which is rotatably mounted the rotor measuring and feeding unit 5.

The shafts 6 and 7 located at either end of the frame members 1 and 2, carry sprockets 8 and 9 which guide the conveyor 10 into timed operative relation to the measuring and feeding unit 5, the carrier buckets 11 on the conveyor 10 being timed with the discharge period of the measuring and feeding unit 5 so that each time a measured quantity of material is released from the measuring member a bucket on the conveyor is in position to receive it.

By reference to Fig. 3 it will be seen that there are two conveyor chains spaced apart and having the buckets 11 pivotally attached therebetween.

A large gear 12 is mounted on the outer end of the shaft 6 and is secured to rotate therewith.

An intermediate shaft 13 is located in suitable bearings in the frame members 1 and 2 and carries a pinion 14 meshing with the gear 12. The shaft 13 also carries another pinion 15 meshing with a ring gear 16 mounted on the measuring unit 5. Thus timed movement is established between the conveyor 10, the buckets 11 and the measuring unit 5.

Power may be applied to the apparatus through the shaft 17, gear 18 and pinion 19 shown on Fig. 1, whereby the conveyor chains 10 are given movement and they in turn transmit movement to the feeding member 5 through the train of gears just described.

The rotary measuring and feeding unit 5 comprises a skeletonized structure consisting of a series of circumferentially spaced open measuring pockets 20 formed by segments and radial walls 21 extending from the segment edges that are parallel to the axis of the rotary member and arranged in regular sequence to move around the bearing portion 4 of the hopper 3.

Figure 7:
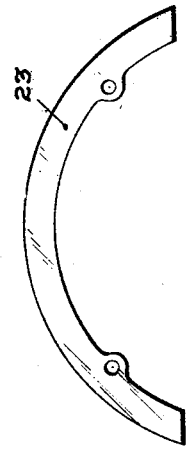
Figure 5:
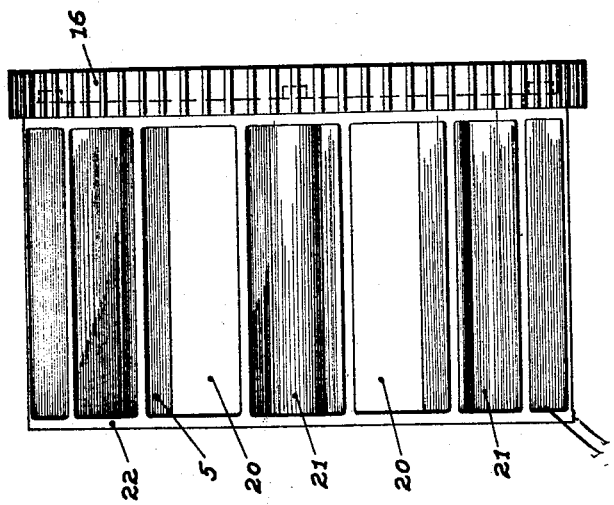

Both ends of the measuring pockets 20 are closed as is shown in Fig. 5, one of the end webs carries the ring gear 16 and the other web, 22, Fig. 5 forms the end closure mentioned. Fig. 6 clearly shows how the ring gear 16 is attached to the unit member 5 by means of suitable bolts. Fig. 7 shows a detail of the retaining segment for holding the measuring unit in lateral position on the hopper as indicated at 23.

The hopper 3 is provided with a laterally inclined bottom member indicated at 24 and at the terminus of this bottom member there is a discharge opening 25 formed by a break in the portion 4 of the hopper. The end of the bottom 24 is rounded and is provided with a concentric reversely extending member 26, having a down turned lip 27. This concentric reverse member 26 is spaced away from the inner periphery of the measuring unit 5 a sufficient distance to admit the passage without crushing, of about two layers of peas. Fig. 2 shows this arrangement very clearly. The reason for this construction will be further referred to.

In the operation of apparatus of this type in the regulation canning factory requires that the measured quantities of peas or other material be discharged in such a manner that they will be conveyed to the next operating machines in the pea line in regular measured quantities, or if this is not possible they may be discharged into temporary containers.

In the arrangement of the apparatus shown by the drawings herewith I have included the complete lay out as is illustrated by Fig. 1. In this lay out the measured quantities of peas are conveyed to a suitable place of disposal constituting hoppers 28, 29 and 30 which may represent the paths leading to the machines for next handling the material.

It is evident that in order to distribute the measured quantities in a uniform ratio to these machines some means must be provided to alternately trip and discharge the buckets 11 as they approach the point of discharge.

This is accomplished through the medium of the location of the toothed portions 31 on each bucket.

It will be noted that the tilting teeth 31 on the lower bucket are located at the extreme right of the bucket. The teeth are located about centrally of the next bucket above and the extreme left of the top bucket.

The operating racks 32 of Fig. 1 are of course located laterally to properly mesh with the teeth on the buckets with the result that the three buckets of Fig. 8 will be alternately tilted and will discharge their contents in the three different hoppers as shown. Each set of three buckets along the conveyor will be arranged in this manner so that the measured material will be uniformly distributed.

Operation

The invention applied to a machine such as is shown by the accompanying drawings will operate in substantially the following manner, if applied to another type or a different construction it may operate differently.

A suitable quantity of peas or other granular material is placed in the hopper compartment and will immediately roll down the laterally inclined bottom 24 and fill any pocket 20 of the rotary measuring member 5 that may be in operative relation with the opening from the hopper. In Fig. 2, where this is best shown, the peas have completely filled one pocket and partially filled another, they are also shown as just completing their discharge from a more advanced pocket.

The rotary measuring unit 5 moves in the direction of the arrow A of Fig. 2. From the position shown in this view the filled pocket will advance toward the discharge station, the clearance space between the inner periphery of the rotor member 5 and the concentric reverse member 26 tending to gradually cut off the charge of peas without crushing or damaging them as on account of this clearance space the peas are permitted to roll freely in said space or escapement chamber and by the time the edge of one of the pockets reaches the downwardly disposed lip edge 27 there will be no peas to come in contact therewith on account of the corner having passed the vertical center and started on the upward line of the circle.

It is seen that the peas have just about stopped rolling through the clearance space in the position of the parts in Fig. 2, and with a further advance of the rotor member 5 they will completely stop before the corner of the advancing pocket encounters the lip 27, so that there is little possibility of any peas becoming crushed or damaged.

The weight of the mass of peas in the hopper is mostly supported by the laterally inclined bottom 24 so there is little crushing effect from the weight of material above the pocket being filled.

The opening from the hopper to the moving measuring pockets is much wider than a pocket to give ample time for the peas to fill, and as there is a more or less lifting and pushing of the mass of peas as a pocket passes this wide opening gives ample freedom to the peas so that they will displace without crushing.

The lower circular frame member 34 forming a retaining wall for the mass of peas in any pocket while moving to the discharge point is so located as to guide the peas gently into the conveyor bucket, and the buckets and the measuring chambers are so timed in their relative movements that all of the peas from any one pocket will be discharged into the bucket moving in timed relation thereto.

It will be noted that the member 34 lies close to the circular path of the rotary member 5 so as to form a closure for the pockets to retain the peas therein until discharged.

A hinged cover 33 is located over the top of the rotor element to facilitate inspection and cleaning.

From the foregoing description it is seen that my improved measuring and feeding device for granular materials will handle such materials in a highly efficient manner; will not tend to crush or damage them and will give accurately measured quantities in regular sequence providing a suitable supply is constantly kept in the hopper provided therefor.

The machine shown as embodying the invention is one of a regular type used for this purpose except that I have adapted it to the operation of my improvement in connection therewith and for the purposes specified.

In closing I wish to add that a very important feature of my invention resides in having the escapement chamber so located and arranged relative to the measuring pockets that peas trapped therein may divide and pass, partly into an advancing pocket or into an approaching pocket, or may move both ways at the same time so that there will be no condition of operation wherein peas will be so confined or restrained in their movements in the escapement chamber to cause any mutilation or crushing since there is an unobstructed outlet at either end of the escapement chamber at all times.

Having thus described my invention what I claim as new and desire to secure by Letters Patent is:

1. An apparatus for measuring and feeding granular material comprising a rotary member consisting of open compartments comprising segments and radial walls extending from the segment edges that are parallel to the axis of the rotary member thus dividing it into a plurality of spaced measuring compartments open at top and bottom, a hopper member forming a bearing around which said rotary member revolves and from which each compartment receives a charge of material in its movement therearound, a segment of a cylindrical wall positioned inside the said rotary member and spaced therefrom to form a free runway and escapement for surplus material as a charge is separated from the said hopper and subsequently discharged from the compartment.

2. An apparatus for measuring and feeding granular material comprising a rotary member consisting of open compartments comprising segments and radial walls extending from the segment edges that are parallel to the axis of the rotary member thus dividing it into a plurality of spaced measuring compartments open at top and bottom, a hopper member forming a bearing around which said rotary member revolves and which forms a support therefor, a casing around the outer periphery of said rotary member forming a closure for the bottoms of said measuring compartments during the period of their travel when receiving charges of material from said hopper, an opening in said casing for the discharge of measured material, a segment of a cylindrical wall positioned inside said rotary member and spaced therefrom to form therewith an escapement runway for excess material as a measured charge is moved away from the source of supply and subsequently discharged from the compartment.

3. An apparatus for measuring and feeding granular material comprising a rotary member consisting of open compartments consisting of segments and radial walls extending from the segment edges that are parallel to the axis of the rotary member to form measuring compartments open at top and bottom, a hopper member supporting said rotary member and forming a bearing around which it revolves, a semi-cylindrical casing surrounding a portion of said rotary member and having a discharge opening therein, a portion of said casing comprising a hinged cover, a portion of a cylindrical wall positioned within the plane of rotation of said rotary member and spaced from the inner cylindrical wall to form therewith an escapement runway for the free movement of excess material and to act as a cut off for the measured charge.

4. An apparatus for measuring and feeding granular material comprising a rotary member consisting of open compartments comprising segments and radial walls extending from the segment edges that are parallel to the axis of the rotary member to form measuring compartments open at top and bottom, a hopper member forming a bearing and support for said rotary member and carrying a supply of material and having an opening of sufficient extent to permit material to flow into at least two of said compartments at the same time, an escapement runway formed by a portion of said hopper and said inner cylindrical wall of said rotary member in advance of a measured charge to permit free movement of excess material without mutilation as a charge is separated from said supply, the excess material moving ahead of said charge passing through said runway and into the compartment that has just discharged its material and passing therefrom through the discharge opening from the apparatus.

5. An apparatus for measuring and feeding granular material comprising a rotary member consisting of cylindrical segments and radial walls connected thereto to form measuring compartments open at top and bottom, a fixed member around which said rotary member rotates and which forms a bearing and support therefor, said fixed member carrying a supply of material and having an opening communicating with the measuring compartments as they are successively moved past said opening, a fixed wall member concentric with said cylindrical segments of said measuring compartments and spaced away therefrom to form a free runway for excess material, said runway opening into a compartment during the period it is receiving a charge and during the period the same compartment is discharging its charge of material thereby forming a cut off to separate the measured charge from the source of supply without mutilation of any material.

6. An apparatus for measuring and feeding granular material comprising a rotary member consisting of cylindrical segments and radial walls connected thereto to form a plurality of measuring compartments, means within the plane of rotation of said rotary member forming a bearing and a support therefor for containing a source of supply of material, said means comprising a fixed wall member spaced away from the inner concentric cylindrical segments of said rotary member and successively forming therefrom a free runway continuously connected with a measuring compartment during the time said compartment is receiving a charge of material and is discharging said material from said apparatus.

7. An apparatus for handling granular material comprising a plurality of segments of wall members arranged in a concentric circle, radial walls connected thereto to form measuring compartments, means forming a bearing for and supporting said assembly to permit rotation around a fixed center and supplying a source of material supply, means for moving said measuring compartments successively past said source of supply to receive measured charges therefrom, a fixed member past which said walled members pass in succession, and form therewith a free runway for the movement of excess material whereby the excess material left in said runway when the measured charge is separated from the main supply may follow said charge without mutilation and pass through said compartment after the main charge has been discharged and also be discharged therewith.

8. An apparatus for handling granular material comprising a plurality of segmental wall members arranged in a concentric circle, radial wall members connected thereto to form measuring compartments, annular members to which said wall members are secured to form a complete rotary unit, a fixed hopper member forming a bearing and support for said rotary unit and over which said wall members project and around which they rotate, said hopper member having an opening that will register successively with said compartments as they move past the same whereby charges of material from said hopper will deposit in said compartments, means for separating said charge from the supply comprising an open ended runway wherein excess material may move with the charge and be discharged through the same compartment that has the charge after it passes therefrom.

9. An apparatus for handling granular material comprising a series of segmental wall members arranged in spaced relation around a circle and each having opposed radial side walls connected therewith to form measuring compartments open at top and bottom, a ring drive member to which said wall members are secured, a fixed hopper member having a bearing and support over which said wall members project and around which they rotate and which forms bottom closure for said compartments during a portion of their travel, a casing member surrounding said wall members and forming a closure for the outer openings of said compartments during a portion of their travel, a material supply in said hopper, a cut off for separating a charge from said supply comprising a restricted runway for a limited movement of material therein and permitting the passage of material in said runway with the discharge of the measured charge from the compartment.

10. An apparatus for handling granular material comprising a rotative unit member comprising a plurality of wall members arranged to move in a circular path and spaced circumferentially to form measuring compartments, means for maintaining said wall members in spaced relation, a fixed member acting as a bearing and support around which said unit revolves and also acting as a source of material supply, a discharge port adjacent the bottom of said fixed member and formed therein with which the said compartments register successively as they rotate and receive a charge of material therefrom, a cut off comprising an annular runway formed by a fixed wall member and a portion of each wall member of the rotary unit as it passes in which material may move freely without crushing and which may pass out of said cut off space with the charge from the compartment.

11. An apparatus for handling granular material in measured charges comprising a rotative unit made up of a plurality of U shaped members spaced apart to form measuring compartments, an annular member to which said spaced members are secured and from which they project in parallel relation, a hopper member which they embrace and around which they rotate as a unit and from which the compartments receive charges of material, means for separating each charge in succession from the main supply consisting of a cutoff member formed by a fixed wall positioned to form an annular space with each of the U shaped members as it passes with the charge in an adjacent compartment, this annular space forming a free runway for material trickling between the main supply and the charge being separated therefrom and which permits said trickling material to pass out with the charge it is following.

12. An apparatus for measuring and feeding granular material comprising a rotary member consisting of open compartments made up of segments and radial walls extending from the segment edges that are parallel to the axis of the rotary member thus dividing it into a plurality of spaced measuring compartments open at top and bottom, a hopper member forming a bearing around which said rotary member revolves and from which each compartment receives a charge of material in its movement therearound, a segment of a cylindrical wall positioned inside the said rotary member and spaced therefrom to form a by-pass for the free movement of excess material moving from the source of supply when a charge is separated therefrom whereby the said excess material may flow into either of two adjacent compartments.

13. In apparatus for handling granular material including a non-mutilating cut off device comprising a hopper having a fixed wall member concentric with the center of rotation of a series of circularly spaced wall members coacting therewith and spaced radially therefrom to form an elongated by-pass pocket therebetween, said elongated by-pass being open at both ends for the movement of material therein while a charge is being cut off from the main supply the material trickling through said by-pass being discharged with the material passing from a measuring pocket in advance thereof, the said hopper forming a bearing around which said spaced wall members rotate with means for rotating the same.

In testimony whereof I hereto affix my signature.

THOS. MARTIN.